(12) United States Patent
Stolte et al.

(10) Patent No.: US 7,809,370 B2
(45) Date of Patent: Oct. 5, 2010

(54) SPACE BASED MONITORING OF GLOBAL MARITIME SHIPPING USING AUTOMATIC IDENTIFICATION SYSTEM

(75) Inventors: John Stolte, Nokesville, VA (US); Anthony Robinson, Leesburg, VA (US); Anthony Hopko, Jefferson, MD (US)

(73) Assignee: ORBCOMM Inc., Fort Lee, NJ (US)

( * ) Notice: Subject to any disclaimer, the term of this patent is extended or adjusted under 35 U.S.C. 154(b) by 631 days.

(21) Appl. No.: 11/806,267

(22) Filed: May 30, 2007

(65) Prior Publication Data
US 2008/0088485 A1    Apr. 17, 2008

Related U.S. Application Data

(60) Provisional application No. 60/809,011, filed on May 30, 2006.

(51) Int. Cl.
H04W 4/00 (2009.01)

(52) U.S. Cl. .................................................. 455/427
(58) Field of Classification Search .................. 455/427
See application file for complete search history.

(56) References Cited

U.S. PATENT DOCUMENTS

| | | | |
|---|---|---|---|
| 4,918,609 A * | 4/1990 | Yamawaki | 701/207 |
| 6,044,323 A * | 3/2000 | Yee et al. | 701/120 |
| 6,317,077 B1 * | 11/2001 | Soleimani et al. | 342/357.05 |
| 2005/0248486 A1 * | 11/2005 | Lee et al. | 342/359 |
| 2008/0304597 A1 * | 12/2008 | Peach | 375/324 |

FOREIGN PATENT DOCUMENTS

JP    2005181078 A   *  7/2005

OTHER PUBLICATIONS

"Maritime traffic monitoring using a space-based AIS receiver" by Torkild Eriksen Norwegian Defence Research Establishment Acta Astronautica 58 (2006) 537-549.*
"Time Synchronization Module for Automatic Identification System" by Choi li-heung Wuhan University Journal of Natural Sciences vol. 8 No. 2B 2003 725-730.*
"Space-based AIS for Global Maritime Traffic Monitoring" by Gudrun K. Hoye Norwegian Defence Research Establishment.*

* cited by examiner

*Primary Examiner*—Matthew D Anderson
*Assistant Examiner*—David Bilodeau
(74) *Attorney, Agent, or Firm*—McNeely & Hare LLP; Kevin J. McNeely

(57) ABSTRACT

An automatic identification system (AIS) communications payload for a space vehicle traveling in earth orbit includes an antenna; a receiver connected to the antenna to receive an AIS signal including a reported vessel position transmitted from a vessel; a processor to process the received AIS messages and determine the accuracy of the reported vessel position; and a transmitter to transmit the processed AIS messages and the determined accuracy to a ground earth element. The processor may be configured to determine a position of the space vehicle; compare the reported vessel position to the space vehicle position; and determine the accuracy of the reported vessel position based on the comparison. The processor also may be configured to flag the AIS message as suspect when the reported vessel position is determined to be inaccurate.

16 Claims, 6 Drawing Sheets

SPACE BASED MONITORING OF GLOBAL MARITIME SHIPPING USING AUTOMATIC IDENTIFICATION SYSTEM

PRIORITY

This application claims priority from U.S. Provisional Application No. 60/809,011, filed May 30, 2006, and titled "Space-Based Network Architecture for Detection and Monitoring of Global Maritime Shipping Using Automatic Identification System," which is hereby incorporated by reference in its entirety for all purposes.

TECHNICAL FIELD

The following description relates generally to an automatic identification system. More specifically, the description relates to space-based network architecture anti-spoofing of reported positions of vessels using an automatic identification system.

BACKGROUND

Navigation at sea and in waterways is inherently dangerous. When navigating, the movement and identity of other ships in the vicinity of a vessel is critical to making decisions to avoid collision and other dangers (e.g., shoals, reefs, bars, or rocks). Historically, navigators rely on a number of aids to prevent collision, such as visual observation (e.g., unaided, binoculars, night vision), audio exchanges (e.g., whistle, horn, radio), radar, and/or an Automatic Radar Plotting Aid (ARPA). However, a lack of positive identification of objects indicated by displays, time delays associated with processing information, and limitations of radar for observing and calculating the action and response of nearby vessels, all may prevent timely action to avoid a collision.

The International Maritime Organization (IMO) and the International Telecommunications Union (ITU) has developed an aid to navigation known as the Automatic Identification System (AIS). AIS was created to improve the navigation and monitoring of ocean going vessels for security and safety reasons. AIS is a system used by ships and traffic services to identify and locate vessels. AIS helps to resolve the difficulty noted above of identifying ships when, for example, visual communications are not easily established (e.g., in fog, at a distance, obstructing terrain features) by allowing ships to exchange information with all other nearby ships and VTS stations.

The AIS works by integrating a standardized VHF transceiver system with an electronic navigation system, such as a LORAN-C or Global Positioning System receiver, and other navigational sensors on board ship (e.g., gyrocompass and rate of turn indicator, among others). Although AIS may be used in navigation to avoid collisions, due to the limitations of radio characteristics of the system (and because not all vessels are equipped with AIS), the system is primarily used to determine risk of collision rather than as an automated collision avoidance system.

AIS also provides data exchange between ships and between ships to shore. While requirements of AIS are only to display very basic text information, the data obtained can be integrated with a graphical electronic chart or a radar display to provide consolidated navigational information on a single display. AIS is mandated by international law for ships engaged in international traffic over 300 tons or more. However, in the near future, AIS will be expanded to include all ships of 500 tons or more in international voyages and possibly others.

SUMMARY

In one general aspect, an automatic identification system (AIS) communications payload for a space vehicle traveling in earth orbit includes an antenna; a receiver connected to the antenna to receive an AIS signal including a reported vessel position transmitted from a vessel; a processor to process the received AIS messages and determine the accuracy of the reported vessel position; and a transmitter to transmit the processed AIS messages and the determined accuracy to a ground earth element.

The processor may be configured to determine a position of the space vehicle; compare the reported vessel position to the space vehicle position; and determine the accuracy of the reported vessel position based on the comparison. The processor also may be configured to flag the AIS message as suspect when the reported vessel position is determined to be inaccurate. In addition, the processor may be configured to use global position information for the space vehicle to determine the position of the space vehicle.

The processor may be configured to: determine a propagation delay of the AIS signal from the vessel to the space vehicle; determine an expected propagation delay from the vessel to the space vehicle based on the vessel position and the space vehicle position; compare the propagation delay to the expected propagation delay; and determine the accuracy of the vessel position based on the comparison. The processor also may be configured to flag the AIS message as suspect when the reported vessel position is determined to be inaccurate. In addition, the processor may be configured to flag the AIS message as suspect when the difference between the propagation delay and the expected propagation delay exceeds a threshold. The processor also may be configured to determine a frequency offset from a nominal frequency and a time delay from a start a communications timing slot to determine the propagation delay.

The antenna may be a very high frequency antenna and the communications payload is configured to travel in a low earth orbit.

In another general aspect, a method to determine accuracy of AIS messages includes: receiving an AIS message that includes a vessel position on a satellite; determining a position of the satellite; comparing the vessel position to the satellite position; and determining the accuracy of the vessel position based on the comparison. The method may further include flagging the message as suspect when the position is determined as inaccurate. Determining a position of the satellite may include receiving the position of the satellite.

In another general aspect, a method to determine accuracy of AIS messages includes: receiving an AIS signal from a vessel including a vessel position at a satellite; determining a propagation delay of the signal from the vessel to the satellite; determining an expected propagation delay from the vessel to the satellite based on the vessel position and the satellite position; comparing the propagation delay to the expected propagation delay; and determining the accuracy of the vessel position based on the comparison. The method may further include flagging the message as suspect when the position is determined as inaccurate. The method may further include flagging the message as suspect when the difference between the propagation delay and the expected propagation delay exceeds a threshold. Determining the propagation delay may include measuring a frequency offset from a nominal frequency and a time delay from a start of a communications timing slot.

Other features will be apparent from the description, the drawings, and the claims.

BRIEF DESCRIPTION OF THE DRAWINGS

Like reference symbols in the various drawings indicate like elements.

DETAILED DESCRIPTION

A low earth orbiting constellation system of satellites is described that implements a space based global AIS monitoring system. The constellation includes a plurality of low earth orbit (LEO) satellites that monitor all AIS equipped vessels on the worlds oceans and waterways, and process AIS signals described herein. The AIS satellite constellation and system are described in greater detail below with examples in reference to the corresponding drawings. One will appreciate that the drawings provided herein are not to scale and are exemplary only for the purpose of illustrating various embodiments described herein.

Figure 1:
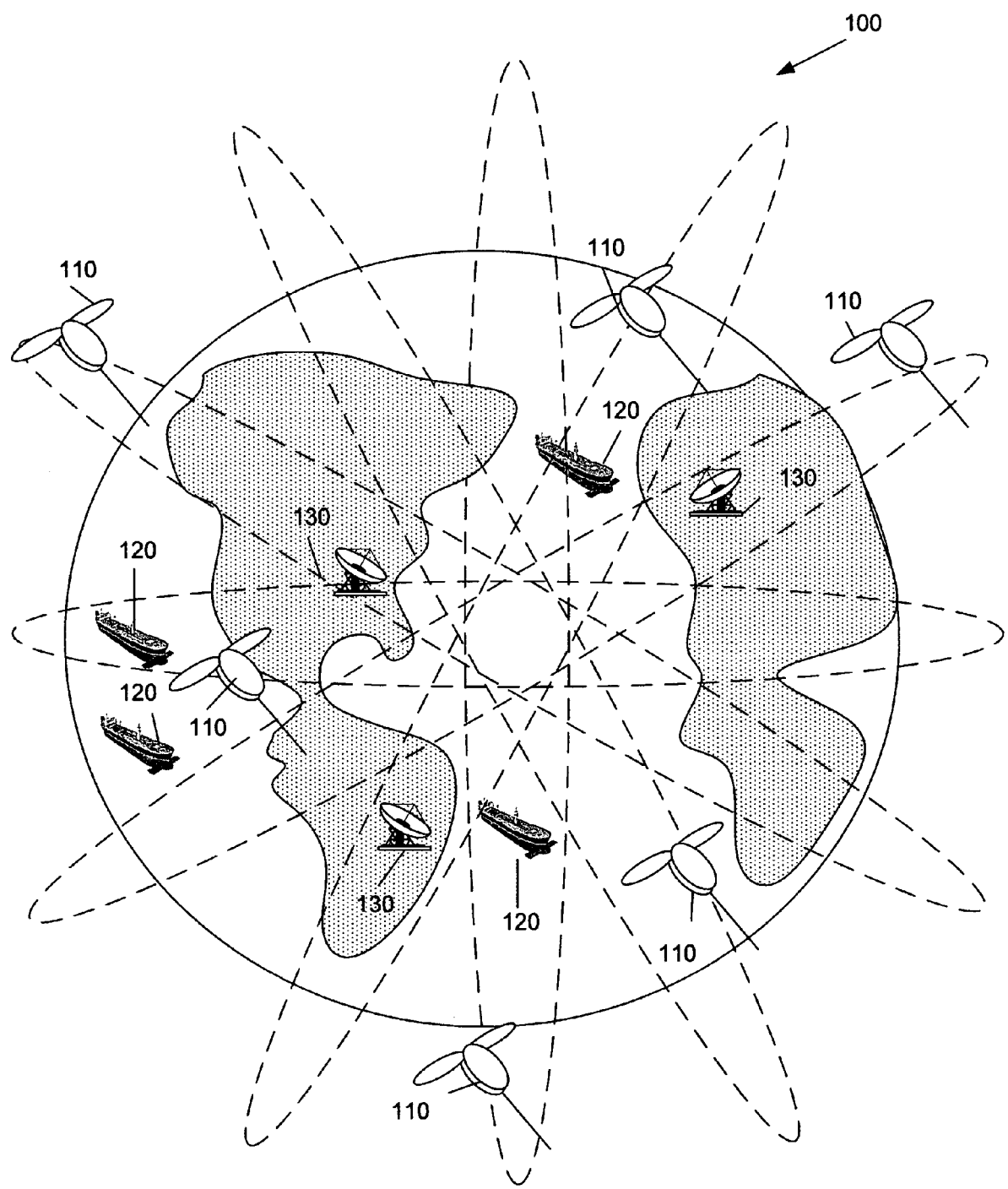
FIG. 1 is an exemplary illustration of an AIS satellite constellation system.

FIG. 1 shows an exemplary AIS satellite system 100. A constellation includes a number of AIS satellites 110 that communicate with vessels 120 and ground elements 130. The AIS satellite system 100 receives and transmits AIS information to and from nearly any vessel 120 via the AIS satellite link to anyplace in the world on a near real time basis.

As shown in FIG. 1, the vessels 120 may be any type of ship, boat, liner, transport, or craft equipped with an AIS subscriber transceiver. The subscriber transceiver of an equipped vessel 120 transmits AIS information or data such as, for example, speed of the vessel, position of the vessel (e.g., latitude and longitude), a course the vessel is traveling, and an identification tracking number (e.g., an MMSI number) as AIS signals and/or messages to the satellite 110.

The satellites 110 may be implemented using a space vehicle capable of traveling in a LEO. The satellites 110 include a communications payload for receiving and transmitting the AIS signals, messages, and/or data. In one example, the satellite 110 also may run one or more applications for processing AIS signals, messages, and or data. The satellites 110 receive AIS information from the vessels 120 and transmit the AIS information to ground elements 130 and/or other vessels 120.

The terrestrial portion of the system includes ground elements 130 located throughout the world. The ground elements 130 implement a network to access the space segment of the system and to provide an interface with public and private data networks that provide AIS information and information derived from AIS information to other third party applications. The ground elements 130 also may process the AIS information to provide a number of applications and/or user interfaces to globally track and monitor vessels 120 simultaneously anywhere in the world.

The satellites 110 may be deployed in a LEO constellation to provide a unique global network of satellites 110 and earth elements 130 to exchange AIS information. The constellation of satellites may be provided by deploying the satellites 110 in LEO in a number of planes (e.g., A-F), semi-major axes, altitudes, inclinations, and orbit periods. The following table shows one exemplary deployment for a constellation of 30 satellites; however, other LEO constellations with various configurations also may be used.

|  | Plane | | | | | |
| --- | --- | --- | --- | --- | --- | --- |
|  | A | B | C | D | E | F |
| Number of Satellites | 8 | 8 | 6 | 6 | 1 | 1 |
| Semimajor axis (km) | 7,178 | 7,178 | 7,178 | 7,178 | 7,078 | 7,078 |
| Altitude (km) | 800 | 800 | 800 | 800 | 710 | 710 |
| Inclination in Degrees | 45 | 45 | 45 | 45 | 70 | 108 |
| Orbit Period (minutes) | 101 | 101 | 101 | 101 | 99 | 101 |

In addition, the constellation orbits may be adjusted over time, and satellites may be replaced and/or supplemented. As a result of the LEO constellation, the AIS satellite system 100 is able to deliver AIS information to and from nearly any AIS equipped vessel 120 to anyplace in the world on a near real time basis making monitoring of vessels on a global basis possible.

Figure 2:
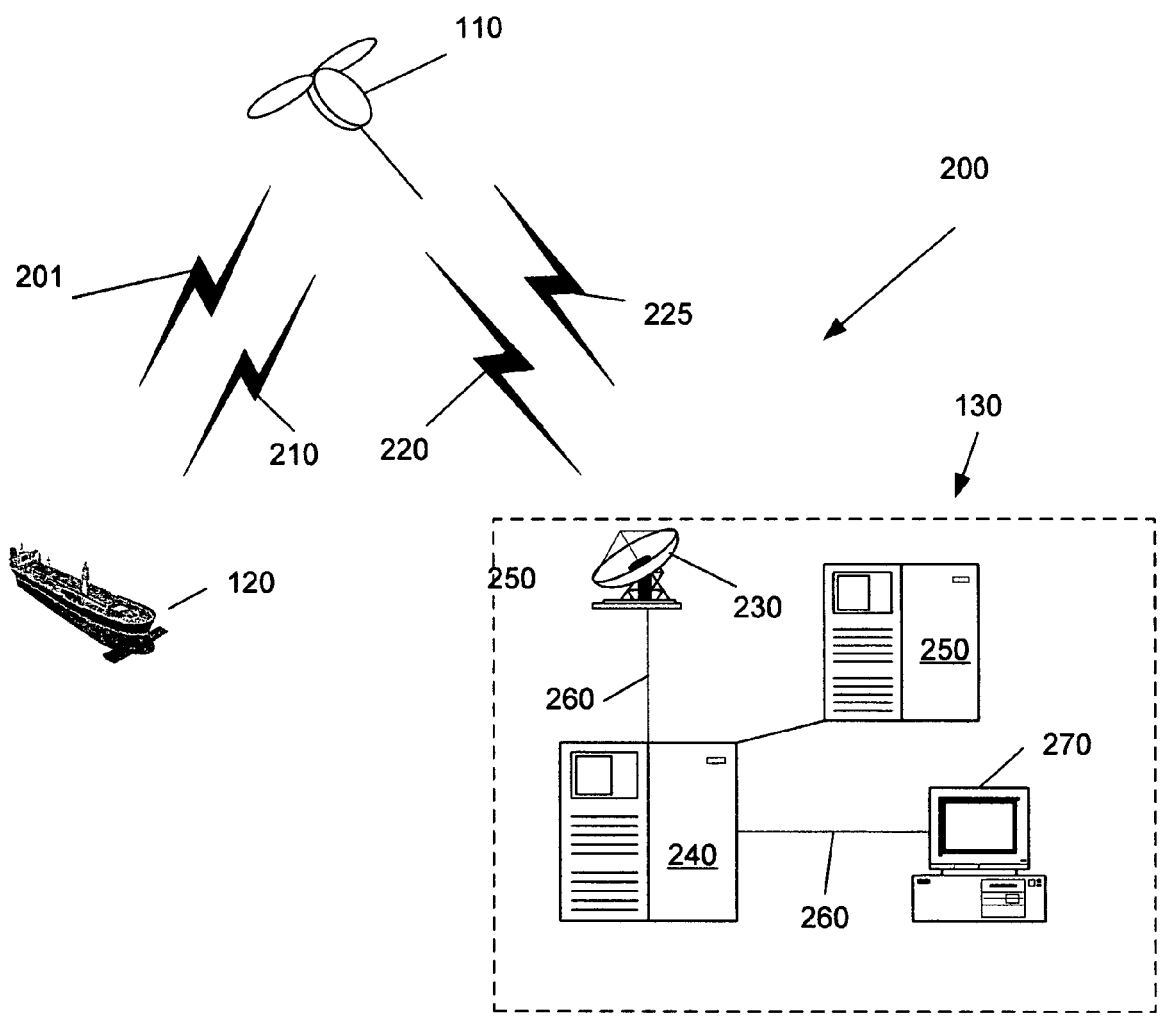
FIG. 2 is an exemplary schematic diagram illustrating AIS satellite communications for use in the system of FIG. 1.

FIG. 2 shows an example of the satellite communications system 200 between a vessel 120, and AIS satellite 110, and ground elements 130. As shown, the system 200 also includes an uplink 201 from the vessel 120 to the AIS satellite 110, a downlink 220 from the AIS satellite 110 to the ground elements 130, and an uplink 225 from the ground elements 130 to the AIS satellite 110.

The terrestrial system or ground elements 130 include one or more gateway earth stations (GES) 230, gateway control centers (GCC) 240, a network control center (NCC) 250, and communications links or paths 260 between the GES, GCC, and NCC. Additionally, the NCC may communicate with other processing devices 270 operated by third parties (e.g., the Coast Guard). A GES includes a freestanding shelter, fuel tank, and power generator. The GES also may include one or more radomes, for example, including enclosed VHF tracking antennas, pedestals, controllers, processors, transceivers, and radio equipment.

The GES-to-satellite links make use of single satellite uplink and downlink channels using a (TDMA) protocol. The TDMA protocol permits several GES to communicate simultaneously with a single satellite and several satellites to communicate with a single GES. Using the TDMA protocol a virtually seamless transfer of satellite connections among GESs under control of the centralized GCC is provided. In one example, each GES may service an area with a radius of approximately 3,300 miles. In one example, GESs in the United States, may be located in New York, Arizona, Georgia, and Washington State with addition GESs in other countries, such as Curacao, Brazil, Italy, Japan, South Korea, Malaysia, Morocco, and Argentina. A NCC may be located in Dulles, Va. The GES receives messages and AIS information transmitted from the satellites and provides the data to the GCC.

The GCC may include various data processing devices, storage devices, communications interfaces, user interfaces, and communications equipment. The GCC processes the AIS information and provides interconnection with other terrestrial networks. In particular, the GCC may provide several AIS applications to process the AIS data. These applications include providing a virtual snapshot of vessels in an area, such as an ocean, a sea, and a waterway; a geo-fence defining a boundary for one or more vessels, and a vessel tracking/monitoring/anti-spoofing system, which are described in greater detail below. The AIS information received for each ship also may be saved and/or stored in a database for further processing and/or data mining.

The NCC provides a centralized control and monitoring of the status of all-terrestrial network elements and space vehicles.

The GES, GCC, and NCC may linked by a number of communications paths. The communications paths may be configured to send and receive signals (e.g., electrical, electromagnetic, or optical) that convey or carry data streams representing various types of analog and/or digital data. For example, the communications paths may be implemented using various communications media and one or more networks comprising one or more network devices (e.g., servers, routers, gateways, bridges, switches, hubs, repeaters, and storage devices). The one or more networks may include a LAN, a WAN, a plain old telephone service (POTS) network, a digital subscriber line (DSL) network, an integrated services digital network (ISDN), a synchronous optical network (SONNET), or a combination of two or more of these networks. In addition, the communications paths may include one or more wireless links (e.g., cellular, mobile, GSM, TDMA, CDMA, and satellite) that transmit and receive electromagnetic signals, such as, for example, radio frequency, infrared, and microwave signals, to convey information.

Each vessel 120 may be equipped with an AIS subscriber terminal. The AIS terminal transceiver includes a processor, a transponder, a transmitter, and an antenna for broadcasting AIS information on AIS communication channels. The AIS signals are broadcast on two frequency channels (e.g., 161.975 MHz and 162.025 MHz) having a channel bandwidth of 25 KHz (with provisions for 12.5 KHz in crowded areas). The signals are frequency modulated (FM) and Gaussian Minimum Shift Keyed (GMSK). Data rates of 9600 bits/second are supported. Typically vertical antenna polarization is used with an omni-directional pattern. Power is supplied at 12.5+/−20% W. The AIS may handle a loading of 2000 messages/minute (spread over both channels) or 1000 messages per minute per channel although higher rates (e.g., up to 3000 messages/minute) may be supported in higher traffic areas (e.g., such as the Singapore Straits). A number of update rates are supported for various vessel speeds, for example, 2 seconds for vessel speeds over 23 knots and maneuvering vessels, 6 seconds for vessel speeds between 14 and 23 knots, and 10 seconds for vessel speeds below 14 knots.

Figure 3:
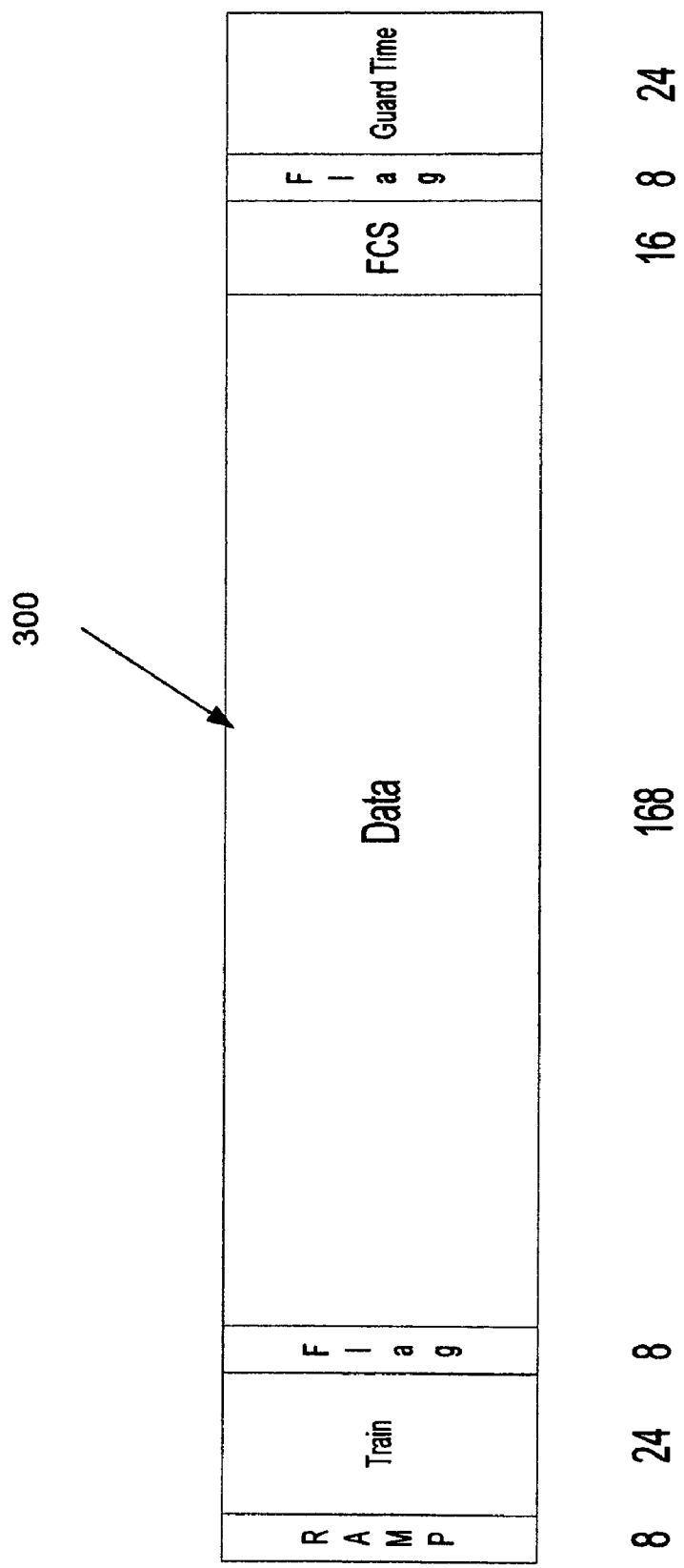
FIG. 3 is an exemplary data packet for a time slot use with the system of FIG. 1.

In one example, the AIS broadcast signals have 2,250 time slots over a one minute period with a time slot duration of 26.67 milliseconds and 256 bits per slot. FIG. 3 shows one example of an AIS data frame 300 for transmission of AIS information in a single time slot. The AIS data frame length is 256 bits. The AIS data frame 300 includes header information (e.g., an 8 bit RAMP, a 24 bit train, an 8 bit flag), a 168 bit data payload, a 16 bit frame check sequence (FCS) for error checking, and a trailer (e.g., an 8 bit flag, and 24 bit guard time). The data payload may include AIS information, such as, for example, speed of the vessel, position of the vessel (e.g., latitude and longitude), a course the vessel is traveling, and an identification tracking number (e.g., an MMSI number), among other data.

The satellite 110 may include a subscriber terminal downlink transmitter, a gateway downlink transmitter, a gateway uplink receiver, and an AIS receiver/processor. The satellites 110 support VHF and UHF communication payloads capable of operation in, for example, the 137.0-150.05 MHz and the 400.075-400.125 MHz bands. Each satellite 110 may be provided with one or more on-board processing devices and storage devices. The AIS receiver/processor captures and transmits global shipping status and data for use by the AIS system in addition to one or more AIS applications (e.g., signal collision avoidance, error checking, and anti-spoofing).

The satellite 110 also may include a gateway uplink receiver that operates, for example, within the 148.0 to 150.05 MHz frequency range. The gateway receiver receives and demodulates one channel of incoming TDMA signals from the GES. The incoming channel may be tuned over the entire uplink frequency band.

A satellite 110 also may include a gateway downlink transmitter to provide communications from a satellite to GES. In one example, the transmitter may operate at 137.0 to 138.0 MHz frequencies. The gateway downlink transmitter may operate using a time division multiple access (TDMA) or broadcast burst mode to transmit messages to the ground elements 130.

Figure 4:
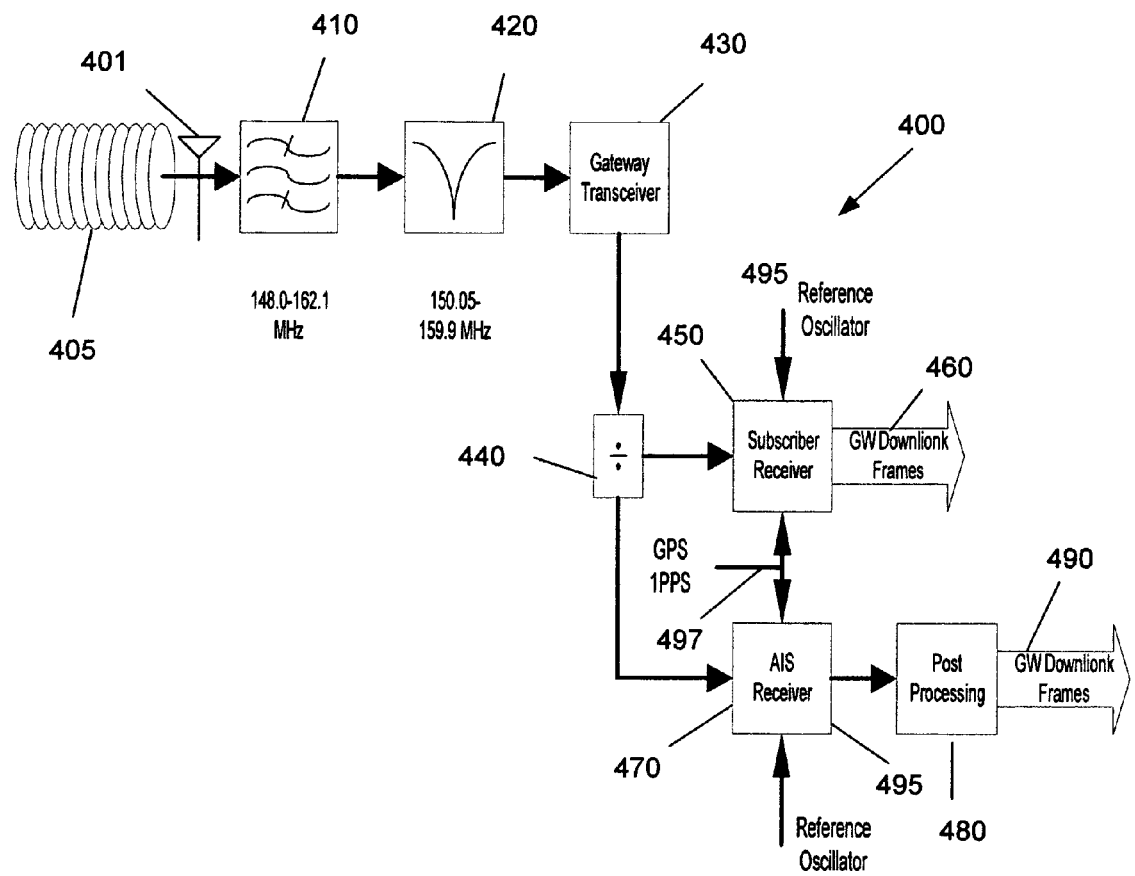
FIG. 4 is an exemplary block diagram of an AIS satellite communications payload for use with the system of FIG. 1.

FIG. 4 shows an example of an AIS satellite communications payload 400 for use with the system of FIG. 1. The communications payload 400 includes an antenna 401 or array of antennae for receiving broadcast signals 405. The signals 405 received on the uplink frequencies channels are passed through a bandpass filter 410 to limit signals received to the desired frequency band of 148.0 MHz to 162.1 MHz. The filtered signals then pass through a second band rejection or notch filter 420 to remove extraneous signals from the portion of the frequency band, 150.05 MHz to 159.9 MHz, that is not used for received uplink AIS satellite communications. The signals may be amplified and converted to digital signals by a gateway transceiver 430. The signal is then divided 440 into halves. Half of the signal is provided to the subscriber receiver 450 for processing of subscriber messages for storage and/or downloading as frames 460 on the satellite to GES downlink. The other half of the signal is provided to the AIS receiver 470 to detect AIS messages and process 480 the AIS messages for storage and/or downloading as frames 490 in on the satellite to GES downlink. A global positioning signal (GPS) and reference oscillator are also supplied to the subscriber receiver 450 and AIS receiver 470 for signal detection, demodulation, and processing.

The AIS receiver/processor receives and demodulates the two AIS broadcast channels using co-channel signal detection. The AIS receiver processor monitors the worldwide AIS default frequencies (e.g., 161.975 and 162.025 MHz). Reports of a vessels location are validated and rate filtered by the receiver/processor. The AIS information received on the channels may be transmitted as messages to the GES on a downlink when connected to a unique gateway ID. Any received AIS information may be stored by a data storage device when the satellite 110 is not connected to the GES and forwarded to the GCC at a later time once a connection on the downlink to the GES has been established. The satellite may be programmed to control the specific rate filter, message storage allocation, and gateway downlink rate used for communications.

The AIS receiver processor receives many messages while monitoring the AIS channels. In order to increase the efficiency with which the messages are handled, the satellite may operate in one of two modes: a back orbit mode; and a connected mode. In the back orbit mode, the satellite receiver is not actively connected or transmitting data to the GES. The receiver/processors queue accepted messages when in the back orbit mode for transmission to the GES when the satellite establishes communications on a downlink to the GES. The queued messages are then downloaded when the satellite establishes a downlink. When in the back orbit mode, the processor may discard duplicate reports from the same vessel to ensure that no more than one report is queued for transmission per a specified time period (e.g., an hour) in order to conserve storage space and/or conserve power usage. In the connected mode, the satellite has an active downlink with the GES and transmits the AIS information and/or messages as they are received from the vessel. In one example, reports from an individual vessel may be limited to no more than twelve per hour in the connected mode.

The receiver processor may receive AIS position reports incident at the spacecraft, provided that any colliding transmissions are sufficiently attenuated or shifted in frequency such that the carrier-to-interference ratio in the bandwidth of the AIS signal is greater than 12 dB. The receiver processor decodes the standard TDMA burst mode of 9600 bps using GMSK demodulation. In one example, the frame duration is one minute, divided into 2250 slots of 26.67 milliseconds as described above.

Figure 5:
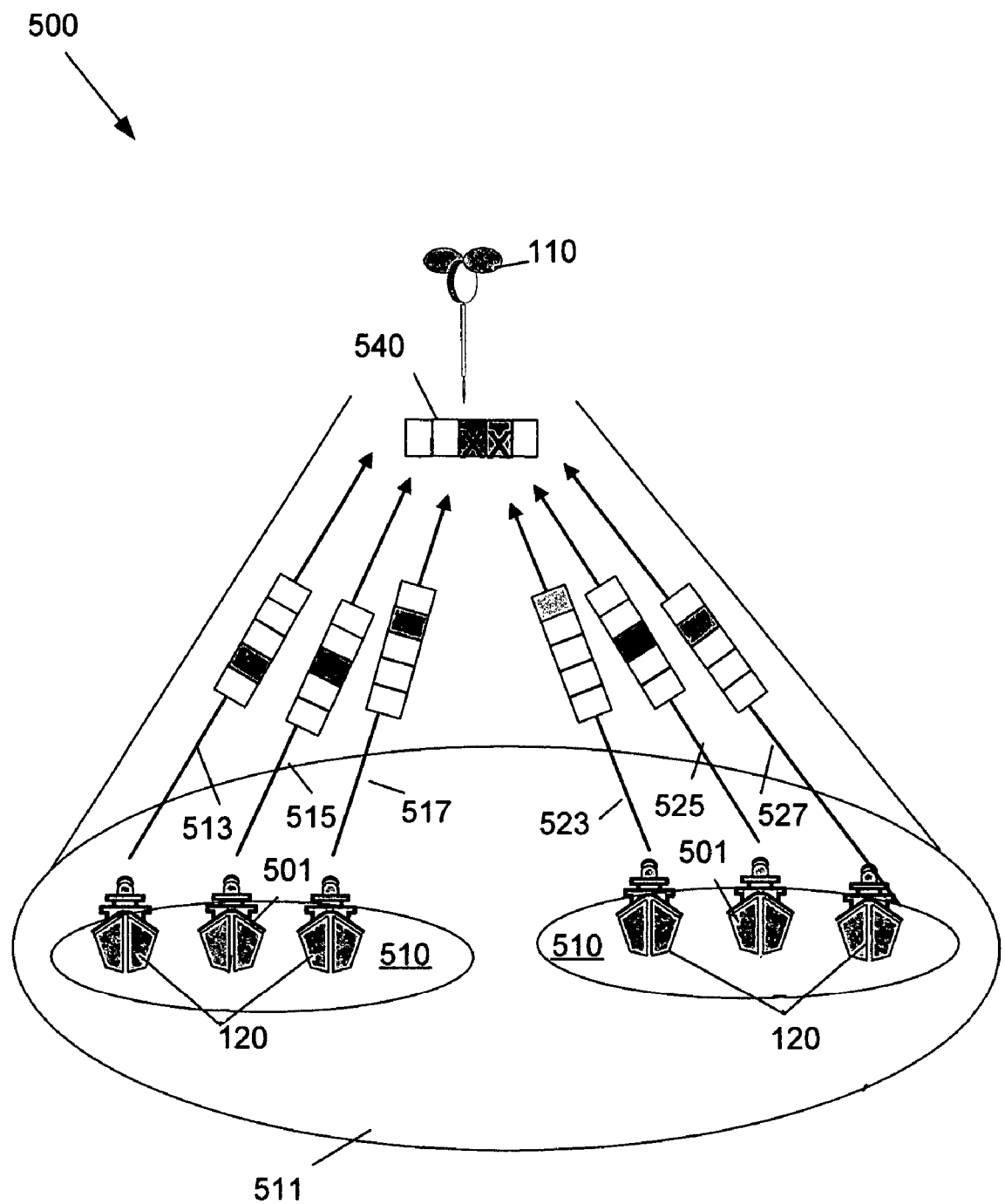
FIG. 5 is an exemplary schematic diagram illustrating AIS satellite packet communications for use in the system of FIG. 1.

The AIS is an autonomous and continuous broadcast system, operating in the VHF maritime mobile band and is capable of exchanging information, such as, for example, vessel identification, position, course, speed and more, between ships and shore. The AIS broadcast system performs information exchange between vessels within VHF range of each other (e.g., approximately 30 Nmi) increasing situational awareness, information exchange between a vessel and a shore station to improve traffic management, automatic reporting in mandatory and voluntary reporting areas, and the exchange of safety related information between vessels and between vessels and shore stations. For example, as shown in FIG. 5, a vessel 501 is able to broadcast AIS information directly to other vessels 120 within a limited line of site region 510.

The ship to ship AIS communications system is operated using a distributed control algorithm. According to this method, ships in radio range of each other cooperate using a self organizing TDMA protocol. However, the Satellite AIS system accommodates several significant differences. Because spacecraft intercept transmissions from a much wider area than the line of sight surrounding a vessel, there is a greater level of contention for slots using a TDMA communications protocol. As a result, the AIS satellite receiver provides signal acquisition to ensure that attenuated signals do not falsely trigger the burst acquisition algorithm (and thereby reduce the opportunity to otherwise decode another signal of sufficient signal level). In addition, there is wider frequency dispersion due to Doppler shift arising from the satellite motion. The Doppler shift range, for example, is on the order of +/−4000 Hz. The transmitter stability is the AIS standard is 3 PPM corresponding to approximately +/−500 Hz. The satellite acquisition range is on the order of 9000 Hz (versus, for example, the 1000 Hz for a terrestrial receiver). Therefore, the satellite may implement a bank of parallel receivers on offset frequencies or a single scanning receiver may be used.

There also is a larger absolute time delay from each vessel transmitter and a wider time dispersion between subsequent transmissions from each vessel due to the much larger propagation delay while the signal travels from the vessel 120 to the satellite 110. The delay window for the AIS protocol is 12 bits at 9600 bps, amounting to 1.25 milliseconds. The propagation delay to the satellite ranges, for example, from a minimum of 2.8 milliseconds, when the satellite is directly over the vessel, to 9.5 milliseconds for a station at 5 degrees elevation angle. As a result, the burst acquisition window of the satellite receiver may be held open longer than that used for a conventional shipboard AIS receiver. There also is larger dynamic range of adjacent channel interference due to the much wider geographic coverage of the receive antenna. As are result, a higher receiver linearity and selectivity is used versus a conventional shipboard receiver.

Detection of co-channel signals has become an increasing concern when trying to improve the capacity of a wireless system. One approach is to use a unique adaptive co-channel detection and demodulation technique for GMSK/FM signal that does not rely on FM discrimination. According to this technique, once the signals are detected, decoded, and synchronized to the frame, if the message ID (MSGID)=1, 2, or 3, the bytes containing the MSGID and MMSI number are decoded to determine whether further processing of the message is required. If the message passes a validity check, the bits are further processed and stored or transmitted to the GES and GCC. If the messages do not pass the validity check, the processing is discontinued and the messages are transmitted to GES and GCC.

As discussed, multiple signals may be received in a time slot of an AIS satellite receiver. The receivers do not differentiate between a signal of interest and co-channel signals and as many of the signals impinging the satellite receiver are separated and demodulated as possible. There exists a high probability of many co-channel signals being received in a single time slot. The co-channel AIS signals have the same spectral efficiency, and there may exist a high probability of error with AIS signals by satellite receiver. For example, as shown in FIG. 5, signals 513, 515, 517, 523, 525, and 527 are transmitted to satellite 110 and received as signals 540. Signals 515 and 525 and signals 517 and 527 have the same slot time. As a result, the signals should arrive at the satellite at the same time. In this case, the receiver processor determines relative frequency offset and arrival time of the conflicting signals. Because there is enough randomness in the system (e.g., it is rare that two signals will have exactly the same frequency offset and arrival time), the AIS receiver picks the message with the lowest frequency offset or lower arrival time and attempts to capture it. If a frequency separation of at least 2 kHz exists between the separation of four co-channel GMSK modulated signals, then co-channel signal extraction is straightforward. GMSK demodulation detects signals using orthogonal coherent detectors and data windows, which complement the reference carrier and timing recovery algorithms.

A GMSK/FM demodulation scheme for frequency separation of co-channel signals may be used. According to one example, an adaptive threshold detector and statistical estimator are used to identify a signal and interfering signals. In most cases, the desired signals have the same average power and transmission time synchronized due to the TDMA transmission. Therefore, the estimator and detector adapt to the noise floor and the signal to interference ratio. This method uses the spatial characteristics of the received signal from various sources (e.g., Doppler, transmitter tolerance, and time difference) for detection of the signals. The probability of a bit error increases with decreasing frequency separation.

When tolerable frequency separation is not present, an interference cancellation (IC) method is employed. Although more computationally intensive, the IC methods remove the interfering signal waveforms from the received signal one at time. Multiple iterations of the IC methods are continued until all of the possible signals are detected, or until the undesired signal waveforms have weaker power.

Although current AIS messaging supports a determination of where vessels are located, it has several disadvantages. For example, the VHF transmission range is only 30 nautical miles. Therefore, conventional AIS communications do not provide global ocean coverage. As a result, monitoring agencies (e.g., the Coast Guard) are only able to track vessels with any certainty when they are relatively near the shore. In addition, the conventional system cannot guarantee an accurate location of the vessels. For example, a ship may turn off its transponder or deliberately tamper with or change its AIS data. At the same time, there is a growing need to provide global maritime surveillance capability for tracking all types of vessels to account for increases in the amount of hazardous material cargoes, human smuggling, and global terrorism, among others. However, the AIS system described herein provides several applications to provide accurate tracking and monitoring of vessels on a global basis thereby aiding governments and agencies that desire tracking of vessels.

Figure 6:
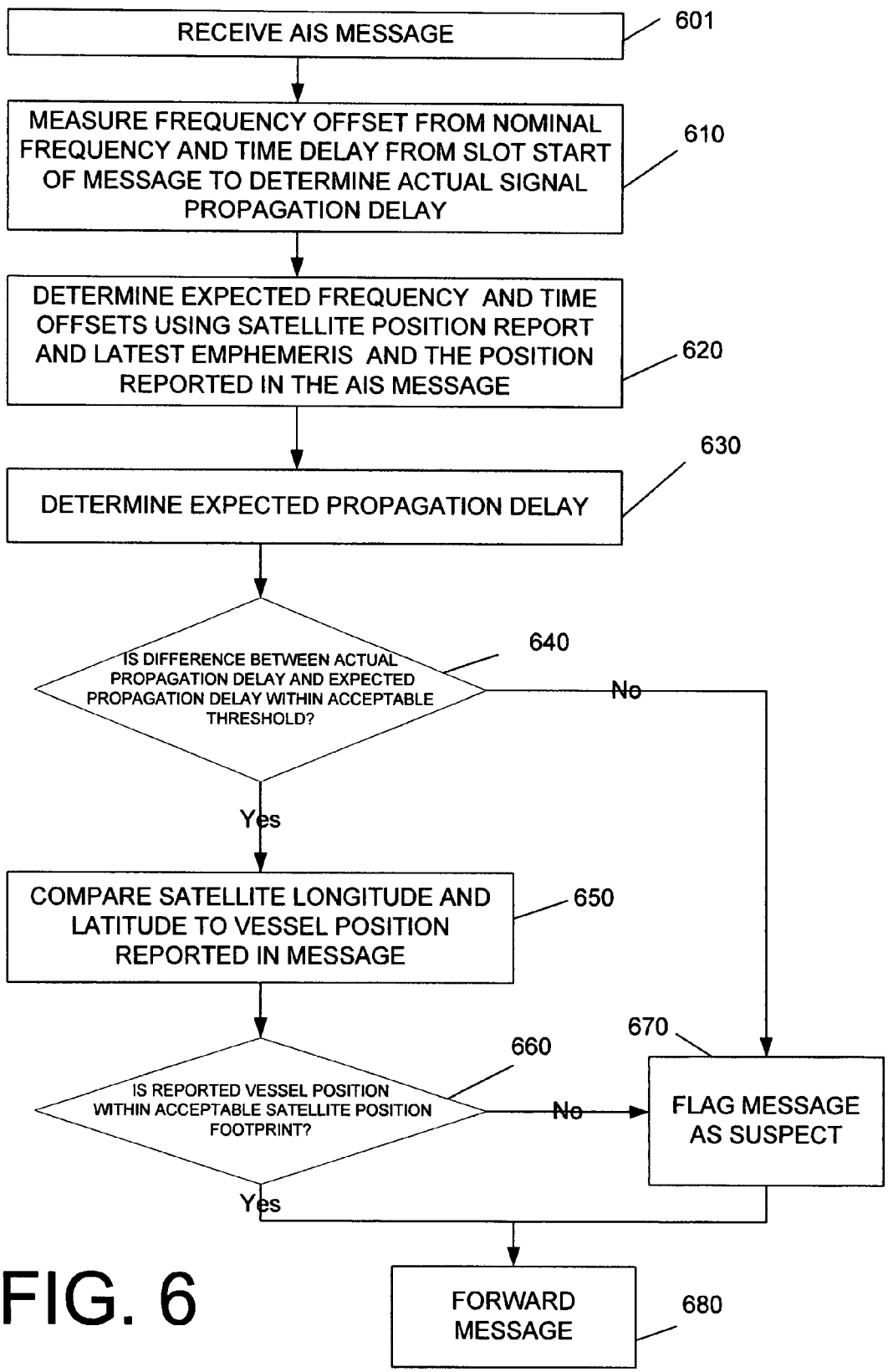
FIG. 6 is an exemplary flow chart for an anti-spoofing application for use in the system of FIG. 1

In order to prevent vessels from tampering with or supplying false AIS information, the satellite or GCC may provide an anti-spoofing application to determine if the position of the ship reported in the AIS information is correct or acceptable as shown in FIG. 6. As described above, AIS messages include the vessel's position coordinates (e.g., latitude and longitude). As the message are received 601, the AIS processor tags each received message with measured frequency offset from a nominal frequency and a time delay from slot start and processes the messages 610. The AIS processor also calculates the expected frequency and time offsets based upon a position report and latest satellite ephemeris 620. Based on the reported position of the vessel and the position of the satellite, a signal propagation delay is determined 630. The AIS processor then compares the arrival time (or actual propagation delay) of the signal to the expected arrival time (or estimated propagation delay). If the difference between the two delays exceeds a threshold or is too large 640, the message may be flagged as suspect 670 and reported 680. The AIS processor also may compare the latitude and the longitude reported in the AIS message to the latitude and longitude determined for the satellite 650. If the difference between the two exceeds a footprint or threshold, the message may be flagged 670 as suspect and reported 680. Suspect messages may be noted by the GCC and the information passed on to third parties for monitoring or further investigation. Alternatively, the antispoofing determination or processing may be carried out separately by the GCC or by both the satellite and the GCC. In this implementation the satellite position data in addition to the AIS message data is supplied to the GCC for determination of the expected footprint and propagation delay.

A number of other applications also may be carried out at the satellite and NCC based on the AIS information received from the vessels. For example, the information received by the NCC of all AIS equipped vessels may be logged and compiled to create a global snapshot and database of the location of all vessels anywhere in the world. The vessels may be identified and presented by a user interface. The snap shot may include various identification schemes to make monitoring, identification, and tracking easier using different shapes, symbols, colors, or animations to identify different and like types of vessels, such as, for example, based on size, type of craft, tonnage, position, destination, cargo, and nationality. In addition, the displays may be interactive, for example, positioning an indicator device such as a pointer or cursor over the representation of a vessel may supply additional information of the vessel (such as, name, identification, size, type of craft, tonnage, ports of call, position, destination, cargo, and nationality). Hyperlinks also may be supplied to link a representation of a vessel on the display to more detailed information stored in a database for the vessel. In addition, to global snapshots, other snapshots may be defined for specific areas, such as, geographical, national, or user defined areas. The areas may be show relative to maps and charts and provided from different altitudes. A zoom in and out feature also may be provided to change the altitude or bird's eye view.

Other applications include geo-fencing. In this application, the user may define a virtual boundary based on global coordinates. The application monitors received AIS messages for a specified vessel relative to the defined boundary. The coordinates of the vessel received in the AIS messages are compared to the virtual boundary. The system may be set to alert a user if a vessel enters a bounded area, leaves a bounded area, or crosses a boundary.

The AIS information also may be processed to determine an expected position, based on the position coordinates, course, and speed data. Satellites may then be programmed to look for vessels at an expected position at a certain time or within a certain time window. If vessels are not detected, the vessel may be tagged for follow-up investigation, including alerting emergency services.

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. An automatic identification system (AIS) communications payload for a space vehicle traveling in earth orbit, the communications payload comprising:
   an antenna;
   a receiver connected to the antenna to receive an AIS signal including a reported vessel position transmitted from a vessel;
   a processor to process the received AIS messages; and
   to determine a position of the satellite; and
   to determine a propagation delay of the signal from the vessel to the satellite; and
   to determine an expected propagation delay from the vessel to the satellite based on said vessel position included in said received AIS signal and the satellite position;
   comparing the propagation delay to the expected propagation delay; and
   to determine the accuracy of the reported vessel position based on the comparison; and
   a transmitter to transmit the processed AIS messages and the determined accuracy to a ground earth element.

2. The payload of claim 1 wherein the processor is configured to:
   determine a position of the space vehicle;
   compare the reported vessel position to the space vehicle position; and
   determine the accuracy of the reported vessel position based on the comparison.

3. The payload of claim 1 wherein the processor is configured to flag the AIS message as suspect when the reported vessel position is determined to be inaccurate.

4. The payload of claim 2 wherein the processor is configured to use global position information for the space vehicle to determine the position of the space vehicle.

5. The payload of claim 1 wherein the processor is configured to:
- determine a propagation delay of the AIS signal from the vessel to the space vehicle;
- determine an expected propagation delay from the vessel to the space vehicle based on the vessel position and the space vehicle position;
- compare the propagation delay to the expected propagation delay; and
- determine the accuracy of the vessel position based on the comparison.

6. The payload of claim 5 wherein the processor is configured to flag the AIS message as suspect when the reported vessel position is determined to be inaccurate.

7. The payload of claim 5 wherein the processor is configured to flag the AIS message as suspect when the difference between the propagation delay and the expected propagation delay exceeds a threshold.

8. The payload of claim 5 wherein the processor is configured to determine a frequency offset from a nominal frequency and a time delay from a start a communications timing slot to determine the propagation delay.

9. The payload of claim 1 wherein the antenna is a very high frequency antenna and the communications payload is configured to travel in a low earth orbit.

10. A method to determine accuracy of AIS messages, the method comprising:
- receiving an AIS message that includes a vessel position at a satellite;
- determining a position of the satellite;
- determining a propagation delay of the signal from the vessel to the satellite;
- determining an expected propagation delay from the vessel to the satellite based on said vessel position included in said received AIS signal and the satellite position;
- comparing the propagation delay to the expected propagation delay;
- and determining the accuracy of the vessel position based on the comparison.

11. The method of claim 10 further comprising: flagging the message as suspect when the position is determined as inaccurate.

12. The method of claim 10 wherein determining a position of the satellite includes receiving the position of the satellite.

13. A method to determine accuracy of AIS messages, the method comprising:
- receiving an AIS signal from a vessel including a vessel position at a satellite;
- determining a propagation delay of the signal from the vessel to the satellite;
- determining an expected propagation delay from the vessel to the satellite based on said vessel position included in said received AIS signal and the satellite position;
- comparing the propagation delay to the expected propagation delay;
- and determining the accuracy of the vessel position based on the comparison.

14. The method of claim 13 further comprising:
- flagging the message as suspect when the position is determined as inaccurate.

15. The method of claim 13 further comprising:
- flagging the message as suspect when the difference between the propagation delay and the expected propagation delay exceeds a threshold.

16. The method of claim 13 wherein determining the propagation delay includes measuring a frequency offset from a nominal frequency and a time delay from a start of a communications timing slot.

* * * * *